US009592806B2

(12) United States Patent
Murayama et al.

(10) Patent No.: US 9,592,806 B2
(45) Date of Patent: Mar. 14, 2017

(54) STROKE SIMULATOR

(71) Applicants: HONDA MOTOR CO., LTD., Minato-Ku, Tokyo (JP); NISSIN KOGYO CO., LTD., Ueda-Shi, Nagano (JP)

(72) Inventors: Kazuaki Murayama, Wako (JP); Jiro Suzuki, Wako (JP); Motoyasu Nakamura, Ueda (JP)

(73) Assignees: Honda Motor Co., Ltd., Tokyo (JP); Autoliv Nissin Brake Systems Japan Co., Ltd., Nagano (JP)

( * ) Notice: Subject to any disclaimer, the term of this patent is extended or adjusted under 35 U.S.C. 154(b) by 182 days.

(21) Appl. No.: 14/388,845

(22) PCT Filed: Mar. 29, 2013

(86) PCT No.: PCT/JP2013/059710
§ 371 (c)(1),
(2) Date: Sep. 29, 2014

(87) PCT Pub. No.: WO2013/147243
PCT Pub. Date: Oct. 3, 2013

(65) Prior Publication Data
US 2015/0059335 A1 Mar. 5, 2015

(30) Foreign Application Priority Data
Mar. 30, 2012 (JP) ................................. 2012-083319

(51) Int. Cl.
B60T 13/20 (2006.01)
B60T 8/40 (2006.01)
(Continued)

(52) U.S. Cl.
CPC .............. *B60T 8/409* (2013.01); *B60T 7/042* (2013.01); *B60T 8/368* (2013.01); *B60T 8/4086* (2013.01);
(Continued)

(58) Field of Classification Search
CPC ....... B60T 8/4081; B60T 8/4086; B60T 8/409
See application file for complete search history.

(56) References Cited

U.S. PATENT DOCUMENTS 5,291,675 A 3/1994 Matsuda et al.
5,988,768 A 11/1999 Schaefer et al.
(Continued)

FOREIGN PATENT DOCUMENTS

CN 1840394 A 10/2006
CN 102015389 A 4/2011
(Continued)

OTHER PUBLICATIONS

Office Action dispatched Feb. 1, 2016 corresponding to Chinese Application 201380016941.8.
(Continued)

*Primary Examiner* — Michael Leslie
(74) *Attorney, Agent, or Firm* — Carrier Blackman & Associates, P.C.; Joseph P. Carrier; Anne G. Sabourin

(57) ABSTRACT

Provided is a stroke simulator in which the piston operates smoothly without being inhibited from displacement thereof by the negative pressure generated in the closed space, even if the piston is configured to be displaced so as to close the space in which the elastic member is housed, and to elastically deform the elastic member. A stroke simulator, in which a simulator piston presses a first return spring, which is housed in a bottomed cylindrical portion, from an opening portion side of the cylindrical portion, to cause the first return spring to be elastically deformed, and to generate a
(Continued)

brake reaction force. When the opening portion is closed by the simulator piston, a brake fluid filled in the cylinder portion is taken into the inside of the cylindrical portion via a flow path leading to the inside of the cylindrical portion from a second cylinder.

3 Claims, 5 Drawing Sheets

(51) Int. Cl.
*B60T 7/04* (2006.01)
*B60T 15/36* (2006.01)
*B60T 8/36* (2006.01)
*B60T 13/14* (2006.01)
*B60T 13/66* (2006.01)
*B60T 13/68* (2006.01)

(52) U.S. Cl.
CPC .......... *B60T 13/146* (2013.01); *B60T 13/662* (2013.01); *B60T 13/686* (2013.01); *B60T 15/36* (2013.01)

(56) References Cited

U.S. PATENT DOCUMENTS

| | | |
|---|---|---|
| 6,808,238 B2 | 10/2004 | Drott et al. |
| 7,032,982 B2 | 4/2006 | Ogiwara et al. |
| 2006/0230757 A1 | 10/2006 | Tagata et al. |
| 2010/0295365 A1 | 11/2010 | Nimura |

FOREIGN PATENT DOCUMENTS

| | | |
|---|---|---|
| JP | 05-193490 A | 8/1993 |
| JP | H11334577 A | 12/1999 |
| JP | 2003-528768 A | 9/2003 |
| JP | 2005-104334 A | 4/2005 |
| JP | 2007176277 A | 7/2007 |
| JP | 2007-210372 A | 8/2007 |
| JP | 2009-227172 A | 10/2009 |
| JP | 2009-279966 A | 12/2009 |
| JP | 2010047039 A | 3/2010 |

OTHER PUBLICATIONS

Extended European Search Report dispatched from the European Patent Office on Sep. 29, 2015 for the corresponding European Patent Application No. EP 13 77 0360.

STROKE SIMULATOR

TECHNICAL FIELD

The present invention relates to a stroke simulator for generating a brake reaction force to be applied to a brake pedal of a braking device.

BACKGROUND ART

There has been well known a braking device (electric braking device) having an electric motor as a driving source of a servo unit for boosting a pedal effort when a brake pedal is depressed. Such an electric braking device is provided with a stroke simulator generating a pseudo-brake reaction force to the brake pedal which is depressed by a driver (refer to Patent Document 1). It is required for the stroke simulator to give the driver an operation feeling similar to a conventional brake pedal which is operated by brake fluid. Therefore, a stroke simulator is disclosed, wherein it is configured that two elastic members having different elastic moduluses are elastically deformed to generate an elastic force (a reaction force) and apply the elastic force to the brake pedal as the brake reaction force, and wherein the reaction force is applied to the brake pedal from each of the two elastic members in response to a depression operation amount of the brake pedal (refer to Patent Document 2).

CITATION LIST

Patent Literature

{Patent Document 1}
Japanese Patent Application Publication No. 2007-210372
{Patent Document 2}
Japanese Patent Application Publication No. 2009-227172

SUMMARY OF INVENTION

Technical Problem

For example, in the stroke simulator disclosed in Patent Document 2, a first spring (first return spring) is housed in a retainer (second spring sheet member) formed in a cup shape, and the first spring is compressed by a piston (simulator piston) which is displaced so as to enter from an opening portion of the retainer to the inside thereof. Further, the piston compresses the first spring until a tip end of a cushioning material (rubber bushing) attached to a tip end portion thereof comes into contact with an opposing wall of the retainer. However, since the cushioning material which is an elastic member is deformed when it comes into contact with the opposing wall, it is not possible to precisely regulate an amount of advancement (a displacement) of the piston to the retainer. In order to regulate the amount of advancement (a displacement) of the piston to the retainer, for example, it is necessary that the piston and the retainer are both rigid and configured such that the piston comes into contact with the retainer.

This configuration easily implemented by a structure in which the piston comes into contact with an opening portion of a cup-shaped retainer. However, according to this configuration, the opening portion of the retainer is closed by the piston, to form a closed space inside the retainer. Then, if the closed space is filled with the brake fluid, a negative pressure is generated in the closed space when the piston is separated from the retainer and separation of the piston from the retainer is inhibited by the negative pressure, and thus a displacement of the stroke simulator is inhibited. Therefore, an object of the present invention is to provide a stroke simulator in which the piston operates smoothly without being inhibited from displacement thereof by the negative pressure generated in the closed space, even if the piston is configured to be displaced so as to close the space in which the elastic member is housed, and to elastically deform the elastic member.

Solution to Problem

In order to solve the above problem, the present invention provides a stroke simulator including a simulator piston which is displaced in a cylinder filled with a brake fluid, in response to a hydraulic pressure which is generated by a hydraulic pressure generating unit due to an operation of a brake operating element by a driver, and a reaction force generating unit which is housed in the cylinder and applies a reaction force corresponding to a displacement of the simulator piston to the simulator piston, wherein the stroke simulator generates the reaction force applied to the simulator piston as a brake reaction force for the brake operating element. And, the reaction force generating unit includes a first elastic member which is elastically deformed by a pressing force due to the displacement of the simulator piston, a guide member which is housed in the cylinder and guides an elastic deformation of the first elastic member, and a second elastic member which is disposed in series with the first elastic member via the guide member, and elastically deformed by the pressing force due to the displacement of the simulator piston, wherein the guide member includes a bottomed cylinder portion which is open to the side of the simulator piston, and a flow path which communicates the inside with the outside of the cylinder portion.

According to this invention, it is possible to allow the brake fluid filled in the cylinder to flow via the flow path into the inside of the cylinder portion of the guide member which is closed at an opening portion thereof by the simulator piston. Therefore, when the simulator piston is separated from the opening portion of the guide portion by the reaction force due to the first elastic member, it is possible to prevent generation of a negative pressure by allowing the brake fluid to suitably flow into the inside of the cylinder portion, thereby rapidly separating the simulator piston from the opening portion.

Further, the flow path according to the present invention is formed through a side wall portion of the cylinder portion. According to this invention, the flow path can be formed in the side wall portion of the cylinder portion. Since punch processing or the like can be used for machining of forming a through-hole in the side wall portion of the cylinder portion, the flow path can be easily formed.

Further, the flow path according to the present invention is formed through a top wall portion of the cylinder portion formed in the guide member. According to this invention, it is possible to form the flow path in the top wall portion of the cylinder portion without limiting to the side wall portion of the cylinder portion.

Furthermore, the flow path according to the present invention is formed in the simulator piston. According to this invention, it is possible to form the flow path in the simulator piston without limiting to the cylinder portion of the guide member.

Advantageous Effects of Invention

According to the present invention, it is possible to provide a stroke simulator in which a piston operates smoothly without being inhibited from displacement thereof by a negative pressure generated in the closed space, even if the piston is configured to be displaced so as to close the space in which the elastic member is housed, and to elastically deform the elastic member.

DESCRIPTION OF EMBODIMENTS

Figure 1:
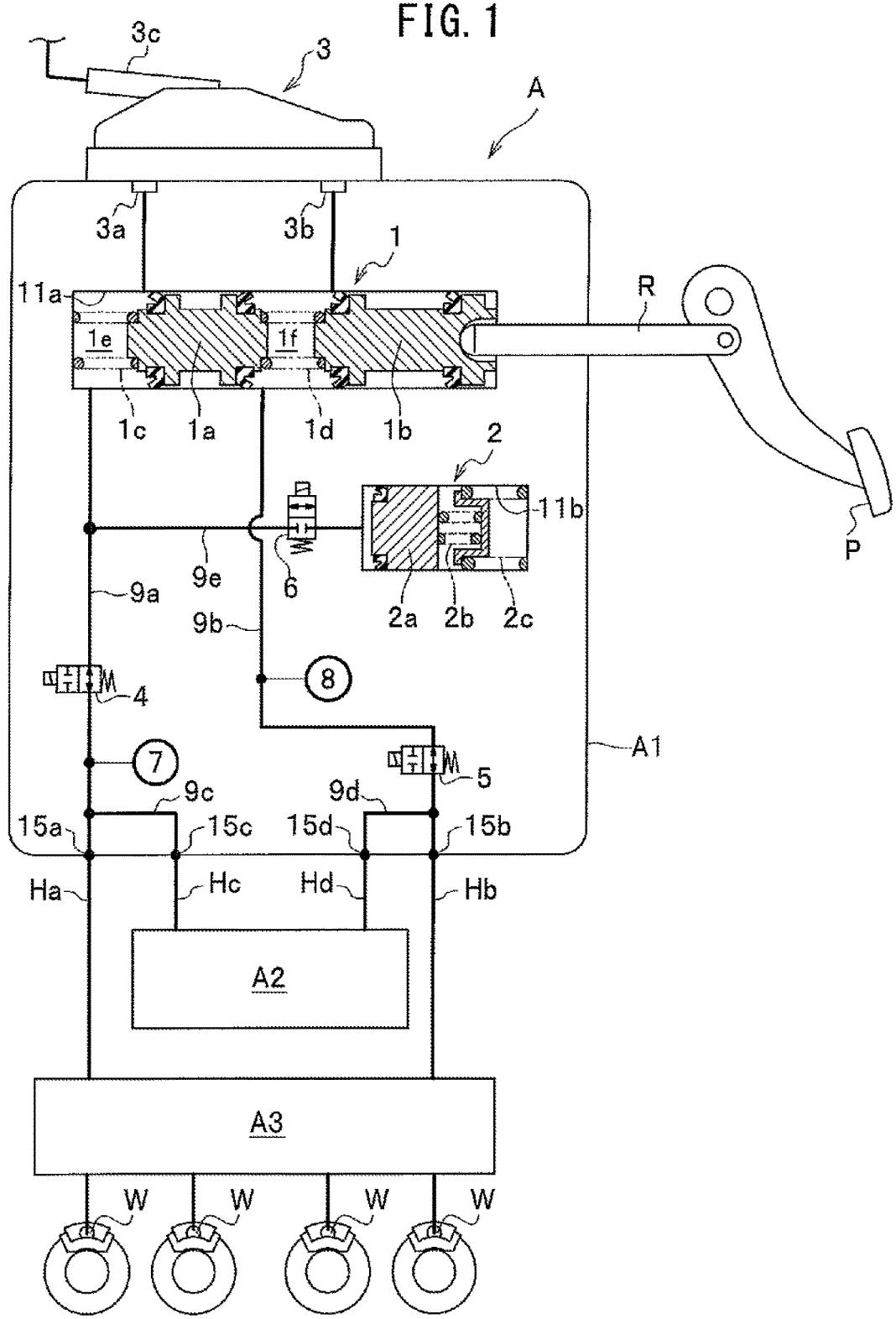
FIG. 1 is a schematic diagram of a vehicle brake system including a stroke simulator according to an embodiment of the present invention.

Hereinafter, embodiments of the present invention will be described in detail with appropriate reference to accompanying drawings. FIG. 1 is a schematic diagram of a vehicle brake system according to an embodiment of the present invention. A vehicle brake system A shown in FIG. 1 includes both of a by-wire (By Wire) type brake system to operate during operation of a prime mover (an engine, a motor, or the like) and a hydraulic type brake system to operate in case of emergency, shutdown of the prime mover, or the like. Further, the vehicle brake system A includes a master cylinder device A1 for generating a brake hydraulic pressure by a depression force when a brake pedal (brake operating element) P is depressed, a motor cylinder device A2 for generating the brake hydraulic pressure by utilizing an electric motor (not shown), and a vehicle stability assist device A3 (hereinafter, referred to as a "hydraulic pressure control device A3") for assisting stabilization of vehicle behavior. The master cylinder device A1, the motor cylinder device A2, and the hydraulic pressure control device A3 are configured as separated units, to be in communication with one another via an external piping.

In addition to an automobile with only an engine (internal combustion engine) as a power source, the vehicle brake system A can be also mounted on a hybrid vehicle using a combination of motor and an engine, an electric vehicle or a fuel cell electric vehicle with only a motor as the power source, or the like.

The master cylinder device (input device) A1 includes a master cylinder 1, a stroke simulator 2, a reservoir 3, normally open type shut-off valves (solenoid valves) 4, 5, a normally closed type shut-off valve (solenoid valve) 6, pressure sensors 7, 8, main hydraulic paths 9a, 9b, contact hydraulic paths 9c, 9d, and a branch hydraulic path 9e.

The master cylinder 1 is a hydraulic pressure generating unit that generates a hydraulic pressure by converting the depression force when the brake pedal P is depressed, to the brake hydraulic pressure. Further, the master cylinder 1 includes a first piston 1a which is disposed on a bottom wall side of a first cylinder bore 11a, a second piston 1b which is connected to a push rod R, a first return spring 1c which is disposed between the first piston and the bottom wall of the first cylinder bore 11a, and a second return spring 1d which is disposed between the two pistons 1a and 1b. The second piston 1b is connected to the brake pedal P via the push rod R. The two pistons 1a, 1b slide (are displaced) upon receiving the depression force of the brake pedal P, and pressurize a brake fluid in pressure chambers 1e, 1f. The pressure chambers 1e, 1f communicate with the main hydraulic path 9a, 9b, respectively.

The stroke simulator 2 is a device that generates and applies a pseudo-operation reaction force (brake reaction force) to the brake pedal P, and includes a simulator piston 2a which is displaced by sliding in a second cylinder bore 11b, and two large and small return springs (a first return spring 2b, a second return spring 2c) which urge the simulator piston 2a. The stroke simulator 2 communicates with the pressure chamber 1e via the branch hydraulic path 9e and the main hydraulic path 9a, and operates by the brake hydraulic pressure generated in the pressure chamber 1e. Details of the stroke simulator 2 will be described later.

The reservoir 3 is a container for reserving the brake fluid, and includes oil supply ports 3a, 3b connected to the master cylinder 1, and a pipe connection port 3c to which a hose extending from a main reservoir (not shown) is connected.

The normally open type shut-off valves 4, 5 are for opening or closing the main hydraulic paths 9a, 9b, and both are made of normally open type solenoid valves. One normally open type shut-off valve 4 opens or closes the main hydraulic path 9a in a section from an intersection of the main hydraulic path 9a with the branch hydraulic path 9e to an intersection of the main hydraulic path 9a with the contact hydraulic path 9c. The other normally open type shut-off valve 5 opens or closes the main hydraulic path 9b on an upstream side of an intersection of the main hydraulic path 9b with the contact hydraulic path 9d.

The normally closed type shut-off valve 6 is for opening or closing the branch hydraulic path 9e, and is made of a normally closed type solenoid valve.

The pressure sensors 7, 8 are for detecting a magnitude of the brake hydraulic pressure, and are mounted in sensor mounting holes (not shown) communicating with the main hydraulic paths 9a, 9b. One pressure sensor 7 is disposed on a downstream side of the normally open type shut-off valve 4, and detects the brake hydraulic pressure generated in the motor cylinder device A2 when the normally open type shut-off valve 4 is in a closed state (a state in which the main hydraulic path 9a is shut off). The other pressure sensor 8 is disposed on an upstream side of the normally open type shut-off valve 5, and detects the brake hydraulic pressure generated in the master cylinder 1 when the normally open type shut-off valve 5 is in a closed state (a state in which the main hydraulic path 9b is shut off). Information obtained by the pressure sensors 7, 8 is outputted to an electronic control unit (ECU, not shown).

The main hydraulic paths 9a, 9b are hydraulic paths originating from the master cylinder 1. To output ports 15a, 15b, which are endpoints of the main hydraulic paths 9a, 9b, pipe materials Ha, Hb leading to the hydraulic pressure control device A3 are connected.

The contact hydraulic paths 9c, 9d are hydraulic paths leading to the main hydraulic paths 9a, 9b from input ports 15c, 15d. To the input ports 15c, 15d, pipe materials Hc, Hd leading to the motor cylinder device A2 are connected.

The branch hydraulic path 9e is a hydraulic path which is branched from one main hydraulic path 9a and leads to the stroke simulator 2.

The master cylinder device A1 communicates with the hydraulic pressure control device A3 via the pipe materials Ha, Hb, and when the normally open type shut-off valves 4, 5 are in an open valve state, the brake hydraulic pressure generated in the master cylinder 1 is inputted to the hydraulic pressure control device A3 via the main hydraulic pressure paths 9a, 9b and pipe members Ha, Hb.

Although not shown, the motor cylinder device A2 includes a slave piston which slides in a slave cylinder, an actuator mechanism having an electric motor and a driving force transmission unit, and a reservoir for reserving the brake fluid in the slave cylinder. The electric motor operates in response to signals from an electronic control unit (not shown). The driving force transmission unit transmits a rotational power to the slave piston after converting the rotational power to a reciprocating motion. The slave piston slides in the slave cylinder upon receiving a driving force of the electric motor, and pressurizes the brake fluid in the slave cylinder. The brake hydraulic pressure generated in the motor cylinder device A2 is inputted to the master cylinder device A1 via the pipe members Hc, Hd, and inputted to the hydraulic pressure control device A3 via the contact hydraulic paths 9c, 9d, and the pipe members Ha, Hb. To the reservoir, a hose extending from the main reservoir (not shown) is connected.

The hydraulic pressure control device A3 is provided with a structure capable of performing an anti-lock brake control (ABS control) for suppressing wheel slip, a traction control, a sideslip control for stabilizing a behavior of a vehicle, or the like, and is connected to wheel cylinders W, W, - - - via pipe materials. In addition, although not shown, the hydraulic pressure control device A3 includes, for example, a hydraulic unit provided with a solenoid valve, a pump, and the like, a motor for driving the pump, and an electronic control unit for controlling the solenoid valve, the motor, and the like.

Next, operation of the vehicle brake system A will be schematically described. During normal time in which the vehicle brake system A functions properly, the normally open type shut-off valves 4, 5 are in a closed valve state, and the normally closed type shut-off valve 6 is in an open valve state. When the driver depresses the brake pedal P in such a state, the brake hydraulic pressure generated in the master cylinder 1 is not transmitted to the wheel cylinder W but to the stroke simulator 2. Then, by the simulator piston 2a being displaced, the brake pedal P is allowed to be depressed, and a reaction force, which is applied to the simulator piston 2a from an elastic member deforming elastically by a displacement of the simulator piston 2a, is generated as a pseudo-brake reaction force, to be applied to the brake pedal P.

Further, when a depression of the brake pedal P is detected by a stroke sensor, or the like (not shown), the electric motor of the motor cylinder device A2 is driven, and the brake fluid in the cylinder is pressurized by the slave piston being displaced. The electronic control unit (not shown) compares the brake hydraulic pressure (the brake hydraulic pressure detected by the pressure sensor 7) outputted from the motor cylinder device A2 with the brake hydraulic pressure (the brake hydraulic pressure detected by the pressure sensor 8) outputted from the master cylinder 1, and controls a number of revolutions or the like of the electric motor on the basis of a comparison result.

The brake hydraulic pressure generated in the motor cylinder device A2 is transmitted to the wheel cylinders W, W, - - - via the hydraulic pressure control device A3, and a braking force is applied to each wheel by each wheel cylinder W being operated.

In addition, in a situation where the motor cylinder device A2 does not work (for example, emergency or if power is not obtained), since the normally open type shut-off valves 4, 5 are both in the open valve state and the normally closed type shut-off valve 6 is in the closed valve state, the brake hydraulic pressure generated in the master cylinder 1 is transmitted to the wheel cylinders W, W, - - - .

Next, a specific structure of the master cylinder device A1 will be described. The master cylinder device A1 of the present embodiment is formed by assembling the above various components to the interior or the exterior of a base body 10 in FIGS. 2A, 2B, and by covering electric components (the normally open type shut-off valves 4, 5, the normally closed type shut-off valve 6, and the pressure sensors 7, 8 (see FIG. 1)) with a housing 20. Note that, mechanical components or the like may be housed in the housing 20.

The base body 10 is a cast product made of aluminum alloy, and includes a cylinder portion 11 (see FIG. 2B, the same below), a vehicle body fixing portion 12, a reservoir mounting portion 13 (see FIG. 2B, the same below), a housing mounting portion 14, and a pipe connecting portion 15. Further, in the interior of the base body 10, holes (not shown) which are the main hydraulic paths 9a, 9b (see FIG. 1), the branch hydraulic path 9e (see FIG. 1), and the like are formed.

Figure 2A:
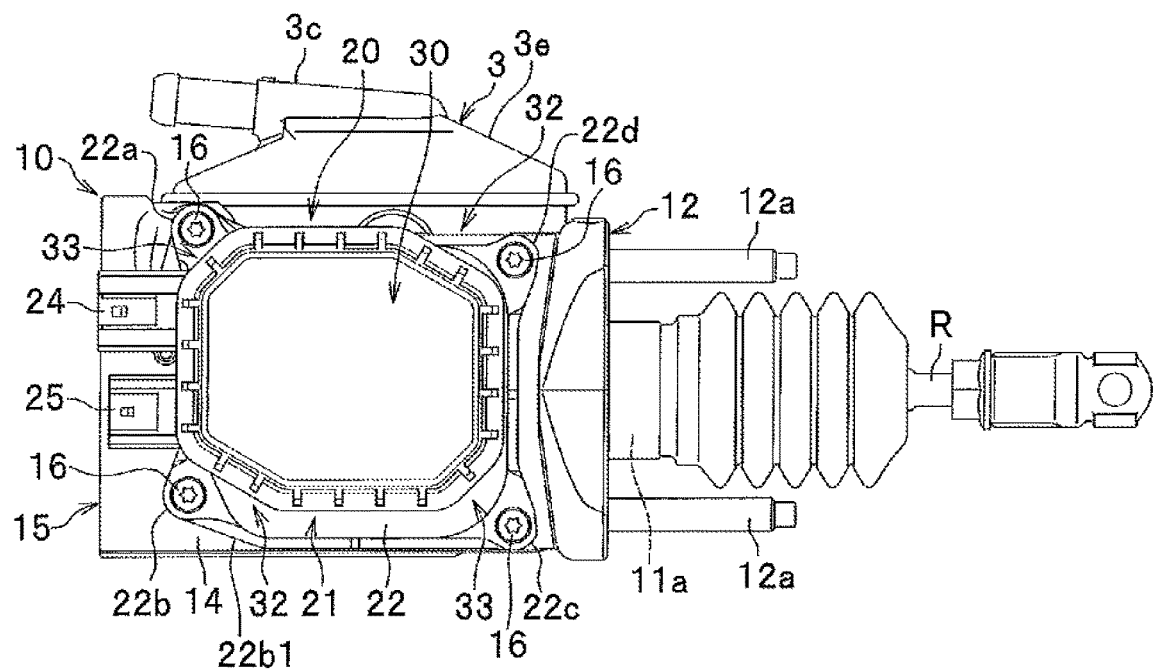
FIG. 2A is a side view of a master cylinder device.
Figure 2B:
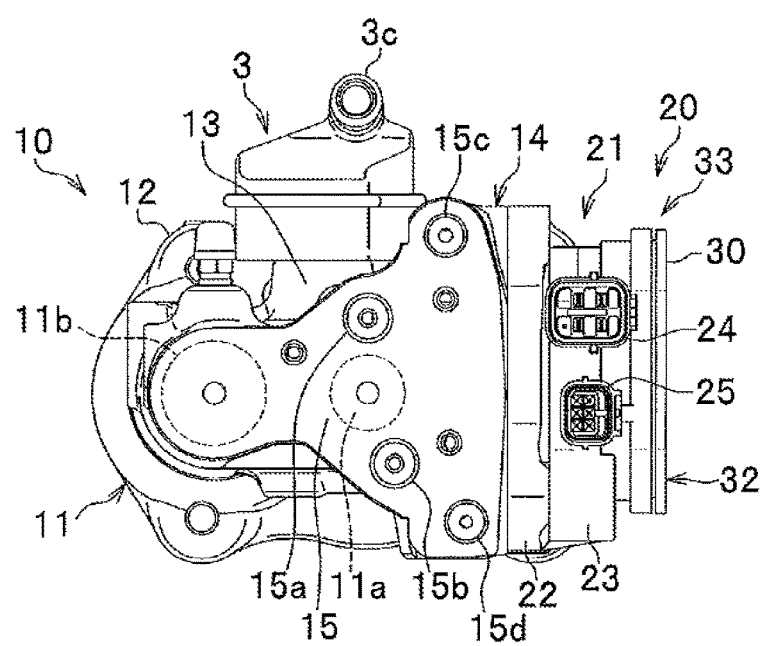
FIG. 2B is a front view of the master cylinder device.

The cylinder portion 11 is formed with a first cylinder bore 11a for the master cylinder, and a second cylinder bore 11b for the stroke simulator (both are shown in dashed lines in FIG. 2B). Both cylinder bores 11a, 11b are bottomed cylindrical shape, and are open to the vehicle body fixing portion 12 while extending toward the pipe connecting portion 15. To the first cylinder bore 11a, components (the first piston 1a, the second piston 1b, the first return spring 1c, and the second return spring 1d) constituting the master cylinder 1 (see FIG. 1) are inserted, and to the second cylinder bore 11b, components (the simulator piston 2a, and the first and second return springs 2b, 2c) constituting the stroke simulator 2 are inserted.

The vehicle body fixing portion 12 is fixed to a vehicle body side fixing portion such as a toe board (not shown). The vehicle body fixing portion 12 is formed in a rear surface portion of the base body 10, and has a flange shape. In a peripheral edge portion (a portion projecting from the cylinder portion 11) of the vehicle body fixing portion 12, bolt insertion holes (not shown) are formed, and bolts 12a are fixed thereto.

As shown in FIG. 2B, the reservoir mounting portion 13 is a portion to be a mounting seat of the reservoir 3, and two (only one is shown) are formed in an upper surface portion of the base body 10. In the reservoir mounting portion 13, a reservoir union port is provided. Note that, the reservoir 3 is fixed to the base body 10 via a connection portion (not shown) projected from an upper surface of the base body 10. The reservoir union port has a cylindrical shape, and communicates with the first cylinder bore 11a via a hole extending toward the first cylinder bore 11a from a bottom surface thereof. To the reservoir union port, a fluid supply port (not shown) projected from a lower portion of the reservoir 3 is connected, and on an upper end of the reservoir union port, a container body of the reservoir 3 is placed.

On the side surface of the base body 10, the housing mounting portion 14 is provided. The housing mounting portion 14 is a portion to be a mounting seat of the housing 20. The housing mounting portion 14 has a flange shape. In an upper end portion and a lower end portion of the housing mounting portion 14, female screws (not shown) are formed, and as shown in FIG. 2A, by screwing mounting screws 16 to the female screws, the housing 20 is adapted to be fixed to the housing mounting portion 14 (the side surface of the base body 10).

Although not shown, in the housing mounting portion 14, three valve mounting holes and two sensor mounting holes are formed. To the three valve mounting holes, the normally open type shut-off valves 4, 5, and the normally closed type shut-off valve 6 (see FIG. 1) are assembled, and to the two sensor mounting holes, the pressure sensors 7, 8 (see FIG. 1) are assembled.

The pipe connecting portion 15 is a portion to be a pipe mounting seat, and is formed on a front surface portion of the base body 10 as shown in FIG. 2A. To the pipe connecting portion 15, as shown in FIG. 2B, the two output ports 15a, 15b and the two input ports 15c, 15d are formed. To the output ports 15a, 15b, the pipe materials Ha, Hb (see FIG. 1) leading to the hydraulic pressure control device A3 (see FIG. 1) are connected, and to the input ports 15c, 15d, the pipe materials Hc, Hd (see FIG. 1) leading to the motor cylinder device A2 (see FIG. 1) are connected.

Figure 3:
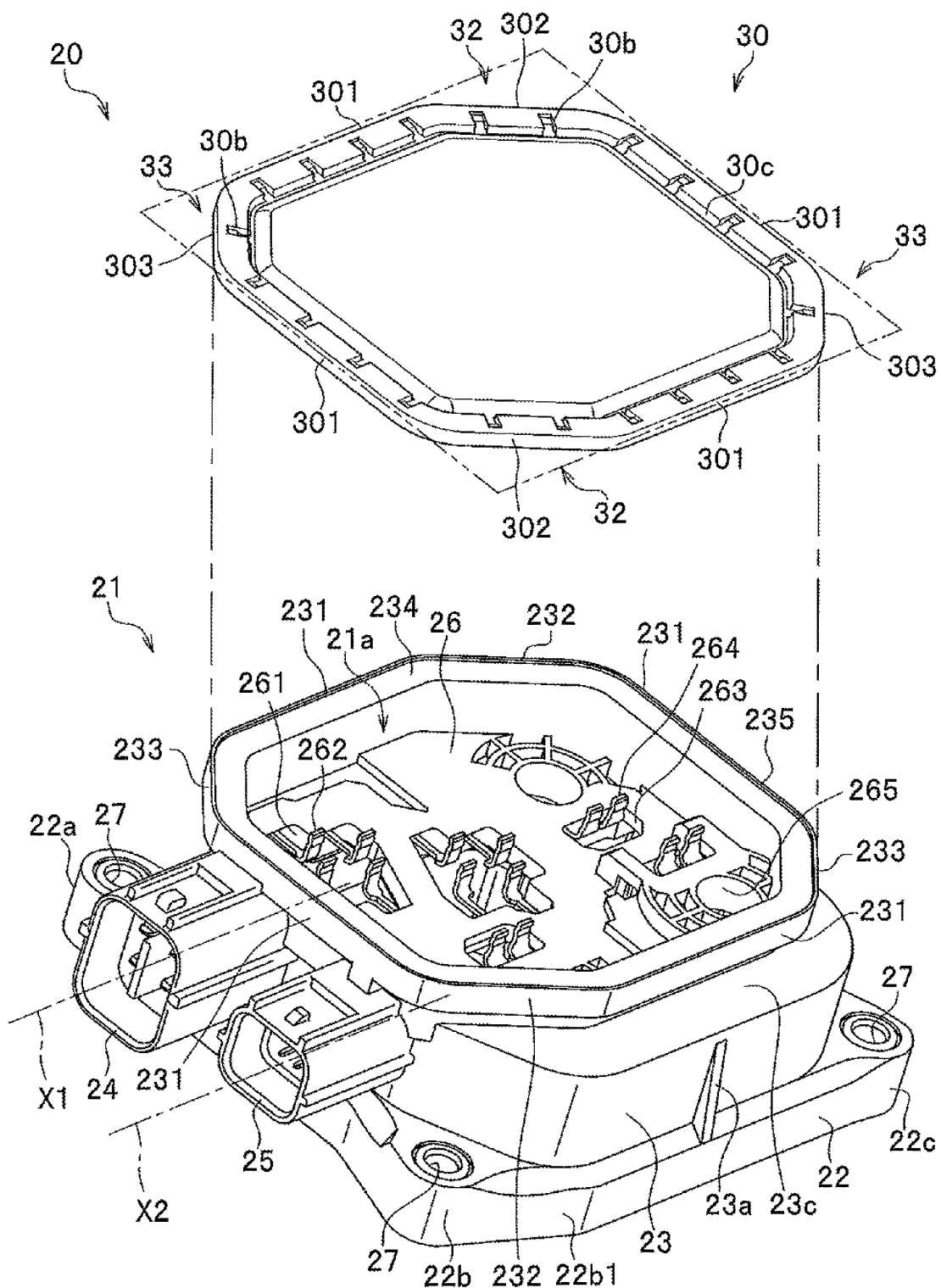
FIG. 3 is an exploded perspective view of a housing.

The housing 20 includes a housing body 21 which covers in a liquid-tight manner the components (the normally open type shut-off valves 4, 5, the normally closed type shut-off valve 6, and the pressure sensors 7, 8, see FIG. 1, the same below) assembled to the housing mounting portion 14, and a lid member 30 which is attached to an opening 21a (see FIG. 3) of the housing body 21. As shown in FIG. 3, the housing body 21 includes a flange portion 22, a peripheral wall portion 23 erected on the flange portion 22, and two connectors 24, 25 as connector portions projected from a peripheral wall surface of the peripheral wall portion 23.

In the inside of the peripheral wall portion 23 of the housing body 21, although not shown, an electromagnetic coil for driving the normally open type shut-off valves 4, 5 (see FIG. 1) and the normally closed type shut-off valve 6 (see FIG. 1) is housed, and a bus bar leading to the electromagnetic coil and the pressure sensors 7, 8 (see FIG. 1) and the like are also housed. Further, the flange portion 22 is a portion which is crimped to the housing mounting portion 14 (see FIG. 2B, the same below). The flange portion 22 is formed to project to the outside of the housing body 21 so as to be continuous with boss portions 22a to 22d as mounting screw portions.

Each of the boss portions 22a to 22d is provided at four corners of the housing body 21 in accordance with a position of the female screw of the housing mounting portion 14. In each of the boss portions 22a to 22d, a collar made of metal is embedded, and in the inside thereof, a screw insertion hole 27 (screw hole) functioning as an insertion hole is formed. In the screw insertion holes 27, the mounting screws 16 (see FIG. 2A, the same below) as fastening members are respectively inserted. When fixing the housing 20 to the housing mounting portion 14 of the base body 10 (see FIG. 2A), it can be performed by evenly fastening each of the mounting screws 16.

As shown in FIG. 3, out of the flange portion 22, a flange portion 22b1 continuing to the boss portion 22b has an inclined shape at a lower surface thereof. An inclination of the flange portion 22b1 is adapted to correspond to an inclination of a first inclined edge portion 232 to be described later of the peripheral wall portion 23. Thus, space saving is achieved.

In addition, in a surface opposing the housing mounting portion 14 of the flange portion 22, a circumferential groove (not shown) is formed, and to the circumferential groove, a seal member of synthetic rubber is attached. The seal member is in close contact with the housing mounting portion 14 by fastening of the mounting screw 16, and serves to hold liquid-tightness of the housing body 21.

On an outer peripheral surface of the peripheral wall portion 23, a rib 23a is provided at a suitable place. As shown in FIG. 3, the rib 23 is formed across to the flange portion 22 from the peripheral wall portion 23.

In the inside of the peripheral wall portion 23, as shown in FIG. 3, a partition wall 26 is formed. In the partition wall 26, sensor connection holes 261 to which the pressure sensors 7, 8 (see FIG. 1) are connected, coil connection holes 263, and solenoid valve insertion holes (insertion holes for the normally open type shut-off valves 4, 5, and the normally closed type shut-off valve 6) 265 are formed. In the sensor connection hole 261 and the coil connection hole 263, terminals 262, 264 are respectively disposed.

As shown in FIG. 3, the lid member 30 is attached to an opening edge 234 of the peripheral wall portion 23. The lid member 30 is fixed to the opening edge 234 by an adhesive means such as an adhesive, an ultrasonic welding, or the like. The opening edge 234 is formed in a shape corresponding to an outer shape of the lid member 30.

As shown in FIG. 3, the lid member 30 is formed in an octagonal outside shape, and is formed in a point symmetric shape with respect to a center corresponding to a center of the opening 21a of the peripheral wall portion 23. The lid member 30 has an outer shape inscribed in a quadrangle (rectangle shown in a two-dot chain line) which is formed with two sets of two opposing sides. The lid member 30 has a pair of first cut portions 32, 32 which is formed by missing one pair of opposing corners out of two pair of opposing corners of the quadrangle by the same size, and a pair of second cut portions 33, 33 which is formed by missing the other pair of opposing corners by the same size. All of the first cut portions 32, 32 and the second cut portions 33, 33 have a triangular shape.

The lid member 30 includes straight edges 301 along sides of the quadrangle, first inclined edges 302, 302 facing the first cut portions 32, 32, and second inclined edges 303, 303 facing the second cut portions 33, 33.

The straight edges 301 are formed four in accordance with four sides of the quadrangle, and all of them have the same length. Two opposing sides of the straight edges 301 are parallel to each other. The first inclined edges 302, 302 connect the adjacent straight edges 301, 301 to each other, and are parallel to each other. The second inclined edges 303, 303 connect the adjacent straight edges 301, 301 to each other, and are parallel to each other.

The first cut portions 32, 32 have areas (amounts of cut) larger than that of the second cut portions 33, 33, and as shown in FIG. 2A, they are arranged such that, on the side of the base body 10, one first cut portion 32 is positioned at a front side lower portion of the base body 10, and the other first cut portion 32 is positioned at a rear side upper portion of the base body 10. Here, the master cylinder device A1 is arranged such that the front side of the base body 10 is mounted toward the front side of the vehicle in an engine room, and thus one first inclined edge 302 is formed at the front side lower portion of the base body 10. In other words, one first inclined edge 302 is adapted to be disposed toward a space in which a structure or a peripheral device M is easily present.

The second cut portions 33, 33 have areas (amounts of cut) smaller than that of the first cut portions 32, 32, and as shown in FIG. 2A, they are arranged such that, on the side of the base body 10, one second cut portion 33 is positioned at a front side upper portion of the base body 10, and the other second cut portion 33 is positioned at a rear side lower portion of the base body 10. In the second cut portion 33 of the front side upper portion, a part of the screw insertion hole 27 of the boss portion 22*a* is positioned in a side view. In other words, the screw insertion hole 27 is formed close to the second inclined edge 303 (peripheral wall portion 23) by using one second cut portion 33. Note that, the center of the screw insertion hole 27 is preferably positioned in the second cut portion 33 of the front side upper portion, and more preferably, the whole of the screw insertion hole 27 is positioned in the second cut portion 33.

In addition, as shown in FIG. 2A, in the first cut portion 32 of the front side lower portion, the whole of the screw insertion hole 27 of the boss portion 22*b* is positioned.

In peripheral edges of a surface of the lid member 30, a plurality of recesses 30*b* are formed at intervals in the circumferential direction. Here, the number of the recesses 30*b* formed in a first inclined edge 302 is two, and the number of the recesses 30*b* formed in a second inclined edge 303 is one. In other words, the number of the recesses 30*b* provided in the peripheral edge facing the first cut portion 32 is larger than the number of the recesses 30*b* provided in the peripheral edge facing the second cut portion 33. In addition, in the four straight edges 301, four recesses 30*b* are provided respectively.

In the inside of the peripheral edge of the lid member 30, a circumferential groove 30*c* is formed. In addition, the circumferential groove 30*c* and each recess 30*b* are in communication with each other.

As shown in FIG. 3, the opening edge 234 of the peripheral wall portion 23 of the housing body 21 is formed in a shape corresponding to the outer shape of the lid member 30, and includes four straight edge portions 231, and the first inclined edge portions 232, 232 and second inclined edge portions 233, 233 which connect the adjacent straight edge portions 231, 231 to each other. The four straight edge portions 231 respectively correspond to the straight edges 301 of the lid member 30, and the first inclined edge portions 232, 232 correspond to the first inclined edges 302, 302 of the lid member 30, and further the second inclined edge portions 233, 233 correspond to the second inclined edges 303, 303 of the lid member 30. The opening edge 234 is formed in a flat surface, and a welding portion formed on a rear surface of the lid member 30 comes into contact with the flat surface, to be welded. In addition, at an outer peripheral edge of the opening edge 234, a circumferential rib 235 is formed.

Such a peripheral wall portion 23 is erected inside of the flange portion 22 in a side view. Further, the peripheral wall portion 23 has a stepped portion 23*c* on the side close to the opening 21*a*, and is shaped such that a lower portion of the peripheral wall portion 23 is offset inwardly at a boundary of the stepped portion 23*c*. Thus, on the side close to the flange portion 22, it is also possible to suitably house a component of relatively large diameter such as a coil on the inside of the peripheral wall portion 23. Further, on the side close to the opening 21*a*, since the lower portion of the peripheral wall portion 23 is offset inwardly, it is possible to achieve space saving around the lower portion of the peripheral wall portion 23.

As shown in FIG. 3, the two connectors 24, 25 are arranged in parallel in the circumferential direction of the peripheral wall portion 23. The connectors 24, 25 are both tubular, and are integrally projected from the peripheral wall portion 23. To the connectors 24, 25, a cable (not shown) leading to the electromagnetic coil, and a cable (not shown) leading to the pressure sensors 7, 8 (see FIG. 1) are connected.

According to the present embodiment, as shown in FIG. 3, central axes X1, X2 of the two connectors 24, 25 are disposed so as to intersect with the straight edge portion 231 of the peripheral wall portion 23. Then, a projecting amount from the peripheral wall portion 23 of one connector 25 provided on the side close to the first cut portion 32 (on the lower side in the up-down direction) is smaller than that of the other connector 24. Also in shape when viewed from the side to which the cables are connected, the connector 25 is smaller than the connector 24.

Description will be returned to FIG. 2A. In addition to the oil supply ports 3*a*, 3*b* (see FIG. 1), the reservoir 3 includes the pipe connection port 3*c* and a connecting flange (not shown). The pipe connection port 3*c* is projected from a container body 3*e* for reserving the brake fluid. To the pipe connection port 3*c*, the hose which is extended from the main reservoir (not shown) is connected. The connecting flange is projected from a lower surface of the container body 3*e*, and is superimposed on the reservoir mounting portion 13 (see FIG. 2B), to be fixed to the connection portion of the base body 10 by a spring pin (not shown).

Figure 4:
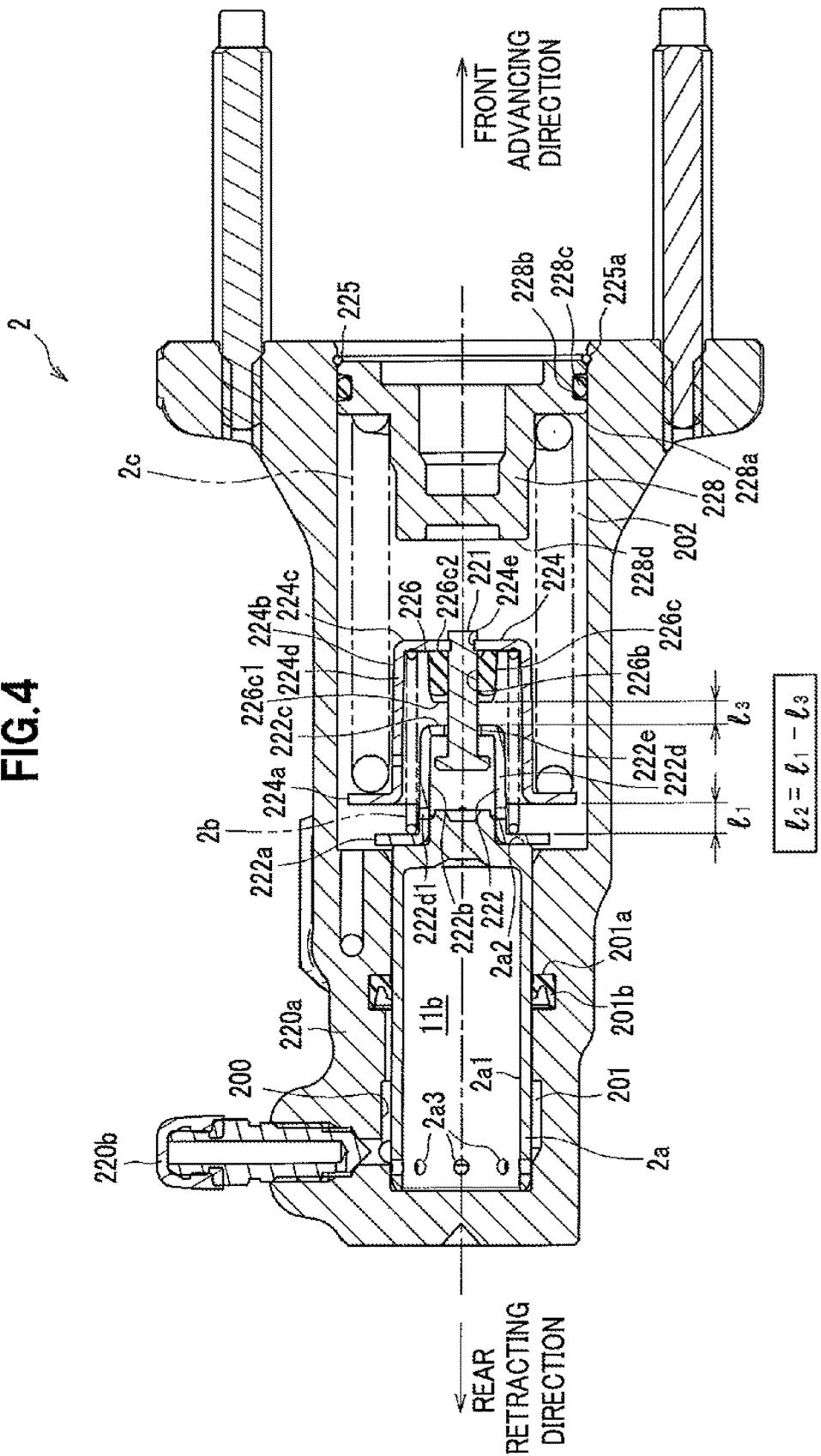
FIG. 4 is a sectional view showing a schematic configuration of the stroke simulator.

The stroke simulator 2, which is incorporated in the master cylinder device A1 (see FIG. 1) configured as described above, is configured such that constituent elements are incorporated in a main body portion 220*a* formed in the base body portion 10 (see FIG. 2A) as shown in FIG. 4 in the present embodiment. As shown in FIG. 4, the stroke simulator 2 according to the present embodiment includes a fluid leading port 220*b* which is connected to the branch hydraulic path 9*e* (see FIG. 1) via the normally closed type shut-off valve 6 (see FIG. 1), a cylinder portion 200 forming the second cylinder bore 11*b* of substantially cylindrical shape, a simulator piston 2*a* capable of being reciprocally displaced in the cylinder portion 200, the first return spring (first elastic member) 2*b* of coil shape having a first elastic modulus $K_1$ (spring constant), and the second return spring (second elastic member) 2*c* of coil shape having a second elastic modulus $K_2$ (spring constant) larger than the first elastic modulus $K_1$. The second cylinder bore 11*b* communicates with the branch hydraulic path 9*e* via the fluid leading port 220*b*. And, when a valve element of the normally closed type shut-off valve 6 (see FIG. 1) is switched to an open position, the brake fluid flows into or flows out of the second cylinder bore 11*b* via the fluid leading port 220*b*.

The cylinder portion 200 is configured such that a first cylinder 201 provided in a retracting direction (left direction in FIG. 4, hereinafter, this direction is defined as "rear") of the simulator piston 2*a*, and a second cylinder 202 provided in an advancing direction (a right direction in FIG. 4, hereinafter, this direction is defined as "front") of the simulator piston 2*a*, are coaxially communicated with each other. Further, the simulator piston 2*a* is configured to be displaced (slide) in the front-rear direction in the first cylinder 201. And, a circumferential inner diameter of the first cylinder 201 is formed smaller than a circumferential inner diameter of the second cylinder 202. Note that, the cylinder portion 200 (first cylinder 201, second cylinder 202) is filled with the brake fluid.

An annular groove 201*a* is formed in an inner wall of the first cylinder 201. To the annular groove 201*a*, for example, a cup seal 201*b* made of silicone rubber is fitted, and the cup seal 201*b* seals a gap formed between the simulator piston 2*a* and the inner wall of the first cylinder 201. Thus, by liquid-tightness which is exerted by the cup seal 201*b*, the second cylinder bore 11*b* is partitioned into the second cylinder 202 and the fluid leading port 220*b* side, so that the brake fluid flowing into the second cylinder bore 11b via the fluid leading port 220b does not leak out to the front side (the second cylinder 202 side) of the cup seal 201b. Then, with this configuration, the hydraulic pressure of the brake fluid flowing in from the fluid leading port 220b can be effectively applied to a pressing force of the simulator piston 2a.

In the simulator piston 2a, a hollow portion 2a1 of substantially cylindrical shape which is open toward the rear (retraction direction) is formed. The hollow portion 2a1 contributes to weight reduction of the simulator piston 2a, and has a function of increasing storage amount of the brake fluid. A projecting portion is formed on a front end wall 2a2 of the simulator piston 2a. A first spring seat member 222 is fitted onto this projecting portion, and is fixed by a joining means such as press fitting or welding. In addition, a plurality of through-holes 2a3 is formed in the hollow portion 2a1. It is configured that the brake fluid taken into the first cylinder 201 from the fluid leading port 220b flows into the hollow portion 2a1 by flowing through the through-holes 2a3.

The first spring seat member 222 is formed to have a bottomed cylinder portion (cylindrical portion 222d) which is closed at the front side thereof, and has a substantial cup shape. The first spring seat member 222 is fixed to the simulator piston 2a in a state in which an opening of the cylindrical portion 222d is closed by the front end wall 2a2. The first spring seat member 222 includes a flange portion 222a of donut disc shape which is hollowed at the central portion thereof, a side wall portion 222b which rises to the front side from an inner peripheral portion of the flange portion 222a, and a top wall portion 222c which covers a top portion of the side wall portion 222b. And, a front end side of the flange portion 222a receives a rear end side of the first return spring 2b. In addition, a reference numeral 222d1 denotes a through-hole which penetrates the cylindrical portion 222d. The through-hole 222d1 is formed for discharging the brake fluid and unnecessary air which accumulates in the inside of the cylindrical portion 222d.

On the front side facing the first spring seat member 222, a second spring seat member 224 having a bottomed cylindrical portion (cylindrical portion 224d) is disposed. The second spring seat member 224 is a guide member for guiding an elastic deformation of the first return spring 2b housed therein as well as for arranging in series the first return spring 2b and the second return spring 2c, and includes a flange portion 224a of donut disc shape which is hollowed at the central portion thereof, a side wall portion 224b which rises to the front side from an inner peripheral portion of the flange portion 224a, and a top wall portion 224c which covers a top portion of the side wall portion 224b. A front end side of the flange portion 224a receives a rear end side of the second return spring 2c. In addition, the bottomed cylindrical portion 224d is formed by the top wall portion 224c and the side wall portion 224b of the second spring seat member 224, and the first return spring 2b is housed inside the cylindrical portion 224d. That is, the top wall portion 224c forms a closed one end of the cylindrical portion 224d.

In the present embodiment as described above, the first return spring 2b and the second return spring 2c are arranged in series via the second spring seat member 224 which is the guide member. Then, a reaction force generating unit is configured to include the first return spring 2b, the second return spring 2c, and the second spring seat member 224.

The size of the second spring seat member 224 is formed larger overall than the size of the first spring seat member 222. Specifically, the outer diameter of the cylindrical portion 222d of the first spring seat member 222 is formed smaller than the inner diameter of the cylindrical portion 224d of the second spring seat member 224, and the cylindrical portion 222d of the first spring seat member 222 is formed so as to enter the inside of the first return spring 2b. A rear end side of the top wall portion 224c of the second spring seat member 224 receives a front end side of the first return spring 2b.

On the front end side of the top wall portion 222c of the first spring seat member 222, a rubber bushing 226 which functions as a third elastic member is provided. The rubber bushing 226 is housed inside the first return spring 2b. Thus, it is possible to arrange the rubber bushing 226 in parallel to the first return spring 2b, thereby effectively utilizing a limited space.

Further, a length between the front end side of the flange portion 222a of the first spring seat member 222 and the rear end side of the flange portion 224a of the second spring seat member 224, is denoted by a first interval $l_1$. On the other hand, a length between the top wall portion 222c of the first spring seat member 222 and an end portion (a first end portion 226c1) on the rear side of the rubber bushing 226 in a state in which an end portion (a second end portion 226c2) on the front side thereof comes into contact with the top wall portion 224c of the second spring seat member 224 by moving to the side of the top wall portion 224c, is denoted by a third interval $l_3$. The first interval $l_1$ is set greater than the third interval $l_3$. Thus, in a second interval $l_2$ obtained by subtracting the third interval $l_3$ from the first interval $l_1$, it is configured such that the rubber bushing 226 is crushed and elastically compressed in addition to elastic compression of the first return spring 2b. By setting the first to third intervals in this manner, the rubber bushing 226 generates a suitable reaction force (third reaction force F3) so that the reaction force applied to the simulator piston 2a can be smoothly switched at a switching point where the reaction force is switched from a reaction force (first reaction force F1) generated by the first return spring 2b to a reaction force (second reaction force F2) generated by the second return spring 2c.

With this configuration, in response to a depression operation of the brake pedal P (see FIG. 1) by the driver, the first spring seat member 222 moves (is displaced) to the second spring seat member 224 in the advancing direction by a length corresponding to the first interval $l_1$, and the first return spring 2b is elastically deformed (elastically compressed) by the length corresponding to the first interval $l_1$. In other words, the first return spring 2b is configured to be elastically deformed by setting the length corresponding to the first interval $l_1$ as a predetermined defined amount. The first interval $l_1$, the second interval $l_2$, and the third interval $l_3$ may be, for example, values which are appropriately determined as design values of the stroke simulator 2 based on the operation feeling and so on required for the vehicle brake system A (see FIG. 1).

Further, in a state in which the brake pedal P (see FIG. 1) is not depressed, if the second return spring 2c is in a state of being elastically compressed by ΔSt2 from a natural length thereof, the second reaction force F2 corresponding to "second elastic modulus $K_2 \times \Delta St2$" is generated in the second return spring 2c at this time. Further, when the first spring seat member 222 is displaced in the advancing direction until the front end side of the flange portion 222a of the first spring seat member 222 comes into contact with the rear end side of the flange portion 224a of the second spring seat member 224 by the depression operation of the brake pedal P by the driver, that is, when the first return spring 2*b* is elastically deformed (elastically compressed) by the predetermined defined amount, if the first return spring 2*b* is in a state of being elastically compressed by ΔSt1 from a natural length thereof, the first reaction force F1 corresponding to "first elastic modulus $K_1 \times \Delta St1$" is generated in the first return spring 2*b*. If the first elastic modulus $K_1$ is set to be smaller than the second elastic modulus $K_2$, it can be configured that firstly the first return spring 2*b* is elastically deformed (elastically compressed) by the predetermined defined amount, and then the second return spring 2*c* starts to be elastically deformed (elastically compressed).

In accordance with that the first return spring 2*b* is elastically compressed in response to the depression operation of the brake pedal P (see FIG. 1) by the driver, and the interval between the top wall portion 222*c* of the first spring seat member 222 and the top wall portion 224*c* of the second spring seat member 224 becomes shorter than a natural length of the rubber bushing 226 in the axial direction thereof, the rubber bushing 226 is elastically compressed in the axial direction thereof. Then, the rubber bushing 226 generates the third reaction force F3 depending on an elastic modulus (a third elastic modulus $K_3$).

On the front side facing the second spring seat member 224, an engaging member 228, which is mounted so as to enter the inside of the second return spring 2*c*, is disposed. The engaging member 228 extends in the radius direction at the front side thereof to form a flange portion 228*a*, and the flange portion 228*a* is fixed by being fitted into the second cylinder 202. Further, an engaging groove 228*b* is formed around the flange portion 228*a*, and an annular seal member 228*c* attached to the engaging groove 228*b* liquid-tightly seals a gap between the second cylinder 202 and the flange portion 228*a*. With this configuration, the brake fluid filled in the cylinder portion 200 (second cylinder 202) is prevented from leaking out from a gap between the second cylinder 202 and the flange portion 228*a*. In addition, the flange portion 228*a* receives the front end side of the second return spring 2*c* at the rear end side thereof.

On the front end side of the second cylinder 202, an annular groove 225*a* in which a retaining ring 225 is fitted is formed so as to circle the inside of the second cylinder 202. The engaging member 228 is disposed such that the front end side of the flange portion 228*a* is on the rear side of the annular groove 225*a*, and thus restricted from moving to the front direction (advancing direction) by the retaining ring 225 fitted in the annular groove 225*a*. With this configuration, the engaging member 228 is prevented from falling out of the second cylinder 202. Further, the engaging member 228 is urged in the front direction by the second return spring 2*c* from the rear end side of the flange portion 228*a*, and is fixed by the front end side of the flange portion 228*a* being pressed against the retaining ring 225.

In each of the top wall portions 222*c*, 224*c* of the first and second spring seat members 222, 224, through-holes 222*e*, 224*e* are open in the central portion thereof. In addition, the rubber bushing 226 is substantially formed with a cylindrical main body portion 226*c* having a hollow portion 226*b* of columnar shape. A rod member 221 is provided so as to penetrate each of the through-holes 222*e*, 224*e* and the hollow portion 226*b* of the rubber bushing 226. In the present embodiment, the diameter of the through-hole 224*e* is smaller than that of the through-hole 222*e*. Further, the rod member 221 has a stepped shape such that an outer diameter at the rear end side thereof is large to be inserted into the through-hole 222*e* and the hollow portion 226*b* of the rubber bush 226, and an outer diameter at the front end side thereof is small to be inserted into the through-hole 224*e*. The rear end side of the rod member 221 has a larger diameter than that of the through-hole 222*e* at the rear end side of the top wall portion 222*c* of the first spring seat member 222, to constitute a stopper. On the other hand, an end portion on the front end side of the rod member 221 has a larger diameter than that of the through-hole 224*e* at the front side thereof, to constitute a stopper. The stopper on the front end side of the rod member 221 can be, for example, easily formed by diameter expansion of the front end side of the rod member 221, which is inserted into the through-hole 224*e* from the rear side thereof, by swaging or the like.

Further, a top portion 228*d* of the engaging member 228 faces the top wall portion 224*c* of the second spring seat member 224, and is a stopper for defining a displacement in the advancing direction of the simulator piston 2*a*. The second spring seat member 224, which moves to the advancing direction in accordance with a displacement of the simulator piston 2*a* to the advancing direction (front direction), moves until the top wall portion 224*c* comes into contact with the top portion 228*d* of the engaging member 228. In other words, it is configured such that the simulator piston 2*a* can be displaced until the top wall portion 224*c* of the second spring seat member 224 comes into contact with the top portion 228*d* of the engaging member 228. Therefore, the displacement of the simulator piston 2*a* when the top wall portion 224*c* comes into contact with the top portion 228*d* is the maximum displacement in the advancing direction of the simulator piston 2*a*. In addition, in the top portion 228*d*, a recess for housing the end portion of the rod member 221 projecting from the top wall portion 224*c* of the second spring seat member 224 is formed. Further, the front side of the engaging member 228 may be configured to be appropriately hollowed for weight reduction.

In this manner, the front end side of the second return spring 2*c* is supported in contact with the main body portion 220*a* of the stroke simulator 2 via the engaging member 228, and the rear side thereof is supported in contact with the flange portion 224*a* of the second spring seat member 224. Further, the front end side of the first return spring 2*b* is supported in contact with the top wall portion 224*c* at the inside of the cylindrical portion 224*d* of the second spring seat member 224, and the rear end side thereof is supported in contact with the flange portion 222*a* of the first spring seat member 222. The first spring seat member 222 is fixed to the front end wall 2*a*2 of the simulator piston 2*a*. As a result, the simulator piston 2*a* is urged in the rear direction (retracting direction) by the first and second return springs 2*b*, 2*c*.

The first and second return springs 2*b*, 2*c* are arranged mechanically in series. The first and second elastic moduluses $K_1$, $K_2$ are set such that an increasing gradient of the reaction force (brake reaction force) applied to the simulator piston 2*a* in an initial stage of the depression of the brake pedal P (see FIG. 1) is small, and an increasing gradient of the reaction force applied to the simulator piston 2*a* in a later stage of the depression of the brake pedal P is large. This is based on a design concept that does not allow the driver to be aware of whether the conventional brake system is mounted or the by-wire type brake system is mounted, by making the brake reaction force for the depression operation amount of the brake pedal P be equivalent to the brake reaction force in the conventional brake system which is operated by the brake fluid.

As described above, the stroke simulator 2 according to the present embodiment is configured such that the cylindrical portion 224*d* of the second spring seat member 224, which is the guide member, enters the inside of the second return spring 2*c* formed in a coil shape, and further the first return spring 2b is housed inside the cylindrical portion 224d. With this configuration, the length (the length toward the rear side from the front side) of the stroke simulator 2 including the first return spring 2b and the second return spring 2c, which are arranged in series with each other, can be shortened. Further, the rubber bushing 226 is configured to be housed inside the first return spring 2b and to be pressed by the front end side of the first spring seat member 222. The first spring seat member 222 presses the first return spring 2b by the front end side of the flange portion 222a, and also presses the rubber bushing 226 by the top wall portion 222c. With this configuration, the rubber bushing 226 can be provided in parallel to the first return spring 2b, in a space where the first return spring 2b is disposed. Therefore, even if it is configured that the second return spring 2c is disposed in series with the first return spring 2b, and the rubber bushing 226 is provided in parallel to the first return spring 2b, it is possible to effectively utilize space resources of the cylinder portion 200 in the stroke simulator 2, thereby suppressing enlargement of the base body 10 (see FIG. 2A).

Figure 5A:
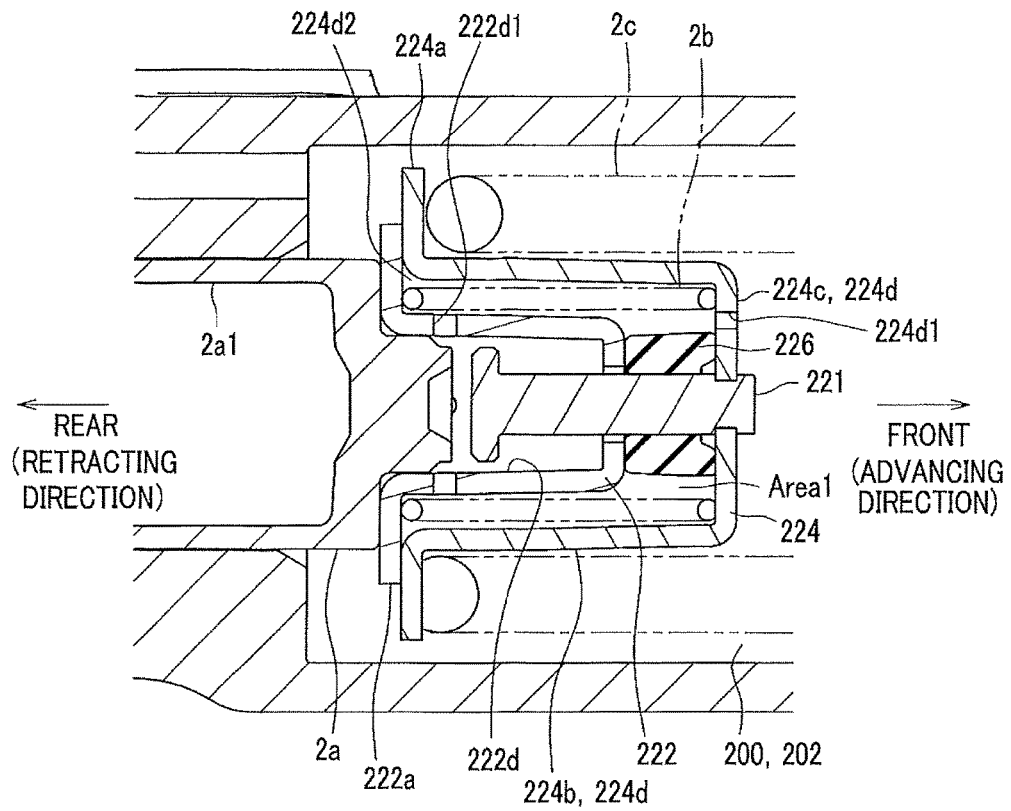
FIG. 5A is a sectional view showing a state in which an opening portion of a second spring seat member is closed.

Further, as described above, when the brake pedal P (see FIG. 1) is depressed, the first return spring 2b is elastically deformed (elastically compressed) earlier than the second return spring 2c, and as shown in FIG. 5A, the cylindrical portion 222d of the first spring seat member 222 enter the inside of the cylindrical portion 224d of the second spring seat member 224 until the front end side of the flange portion 222a comes into contact with the rear end side of the flange portion 224a of the second spring seat member 224. At this time, an opening portion 224d2 of the cylindrical portion 224d is closed by the simulator piston 2a (more specifically, the first spring seat member 222), and a closed space Area1 is formed between the cylindrical portion 224d of the second spring seat member 224 and the cylindrical portion 222d of the first spring seat member 222.

Since the brake fluid is filled in the cylinder portion 200 (see FIG. 4) of the stroke simulator 2, the brake fluid is also filled in the closed space Area1. If the closed space Area1 is a hermetically-closed space, the brake fluid filled in the cylinder portion 200 does not favorably enter the closed space Area1, and the first spring seat member 222 becomes hard to be separated from the second spring seat member 224. For example, when the brake pedal P (see FIG. 1) is released and the brake hydraulic pressure applied to the simulator piston 2a is reduced, the first spring seat member 222 is pushed in the retraction direction by the reaction force of the first return spring 2b. At this time, if the brake fluid is not supplied to the closed space Area1 from the cylinder portion 200, a negative pressure is generated in the closed space Area1, to inhibit the displacement in the retracting direction of the first spring seat member 222, and thus to inhibit the displacement in the retracting direction of the simulator piston 2a and inhibit smooth operation of the stroke simulator 2.

Figure 5B:
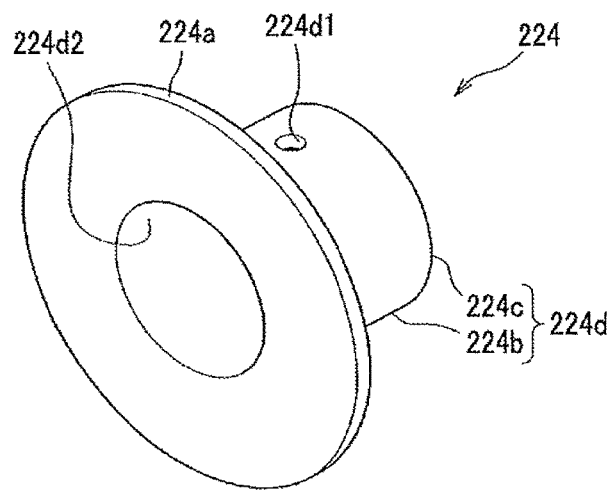
FIG. 5B is a perspective view of the second spring seat member.

Therefore, as shown in FIGS. 5A, 5B, a flow path 224d1 leading inward from the outside of the cylindrical portion 224d is, for example, configured to be formed in the cylindrical portion 224d of the second spring seat member 224. And it is configured that the brake fluid flows through the flow path 224d1. With this configuration, for example, if the brake pedal P (see FIG. 1) is released, when the first spring seat member 222 is pushed in the retracting direction by the reaction force of the first return spring 2b, the brake fluid flows into the closed space Area1 via the flow path 224d1 from the cylinder portion 200 (second cylinder 202). Therefore, the negative pressure is not generated in the closed space Area1, and the first spring seat member 222 is quickly displaced in the retracting direction by the reaction force generated in the first return spring 2b. And the stroke simulator 2 operates smoothly.

A position where the flow path 224d1 is formed is not particularly limited. However, for example, flange portion 224a is configured to receive the rear end side of the second return spring 2c at the front end side thereof, and the rear end side of the second return spring 2c is engaged in a vicinity of the flange portion 224a. Therefore, the flow path 224d1 is preferably formed so as to avoid the vicinity of the flange portion 224a. With this configuration, at the rear end side of the second return spring 2c, the brake fluid is not inhibited from flowing into the closed space Area1, and the brake fluid can effectively flow into the closed space Area1.

Further, the first return spring 2b is housed inside the cylindrical portion 224d of the second spring seat member 224, and inside the cylindrical portion 224d, the rear end side of the top wall portion 224c receives the front end side of the first return spring 2b. Therefore, the flow path 224d1 is preferably formed so as to avoid a vicinity of the top wall portion 224c. With this configuration, at the front end side of the first return spring 2b, the brake fluid is not inhibited from flowing into the closed space Area1, and the brake fluid can effectively flow into the closed space Area1.

From the above, the flow path 224d1 is preferably formed in the cylindrical portion 224d so as to avoid a part, that requires some degree of rigidity, such as the vicinity of the flange portion 224a for receiving the rear end side of the second return spring 2c and the vicinity of the top wall portion 224c provided with the through-hole 224e (see FIG. 4), through which the rod member 221 passes. For example, the flow path 224d1 is preferably configured to be formed in the side wall portion 224b avoiding the vicinity of the flange portion 224a and the vicinity of the top wall portion 224c. Such a flow path 224d1 can be easily formed by punching from the outside or the inside of the cylindrical portion 224d.

In addition, not to limited to the side wall portion 224b, the flow path 224d1 may be configured to be formed in the top wall portion 224c. Also in this case, the flow path 224d1 is preferably configured to be formed to avoid a position where the front end side of the first return spring 2b is engaged and a position which is closed by the rubber bushing 226.

Further, the number of the flow paths 224d1 is not limited, either. One flow path 224d1 may be configured to be formed, and two or more flow paths 224d1 may be configured to be formed. Further, one or more flow paths 224d1 may be configured to be formed in each of the top wall portion 224c and the cylinder portion 224d. Further, the shape of the flow path 224d1 is not limited, either. For example, the flow path 224d1 may be circular or elliptical, and the flow path 224d1 may be square or rectangular. By reducing the number of the flow paths 224d1 to be smaller than the number of the through-holes 222d1, it is possible to prevent a reduction of the rigidity of the second spring seat member 224 which receives the second return spring 2c having a large elastic force. Further, by increasing an opening area of a formed flow path 224d1 or the total opening area of flow paths 224d1 to be larger than an opening area of a formed through-hole 222d1 or the total opening area of through-holes 222d1, it is possible to prevent inhibition of the displacement of the simulator piston 2a.

Further, the simulator piston 2a (see FIG. 4) according to the present embodiment is an integral structure attached with the first spring seat member 222, however, the simulator piston 2a may be configured not to be attached with the first spring seat member 222. In this case, the front end wall 2a2 (see FIG. 4) of the simulator piston 2a presses the first return spring 2b (see FIG. 4) and the rubber bushing 226 (see FIG. 4). In addition, it is configured that the front end wall 2a2 (see FIG. 4) of the simulator piston 2a closes the opening portion 224d2 (see FIG. 5A) of the second spring seat member 224.

REFERENCE SIGNS LIST

1: master cylinder (hydraulic pressure generating unit)
2: stroke simulator
2a: simulator piston
2b: first return spring (first elastic member, reaction force generating unit)
2c: second return spring (second elastic member, reaction force generating unit)
200: cylinder portion
201: first cylinder
202: second cylinder
222d1: through-hole (flow path)
224: second spring seat member (guide member, reaction force generating unit)
224b: side wall portion
224c: top wall portion
224d: cylindrical portion
224d1: flow path
224d2: opening portion
226: rubber bushing (third elastic member)
P: brake pedal (brake operating element)

The invention claimed is:

1. A stroke simulator comprising:
a simulator piston which is displaced in a cylinder filled with a brake fluid, in response to a hydraulic pressure which is generated by a hydraulic pressure generating unit due to an operation of a brake operating element by a driver; and
a reaction force generating unit which is housed in the cylinder and applies a reaction force corresponding to a displacement of the simulator piston to the simulator piston,
wherein the stroke simulator generates the reaction force applied to the simulator piston as a brake reaction force for the brake operating element,
wherein the reaction force generating unit comprises:
a first elastic member which is elastically deformed by a pressing force due to the displacement of the simulator piston;
a first spring seat member which has a bottomed cylindrical portion and is fixed to the simulator piston in a state in which an opening of the cylindrical portion is closed by a front end wall of the piston, and which includes a flange portion of donut disc shape which is hollowed at the central portion thereof, a side wall portion which rises to the front side from an inner peripheral portion of the flange portion, and a top wall portion which covers a top portion of the side wall portion, and wherein a front end side of the flange portion receives a rear end side of the first elastic member,
a second spring seat member which is housed in the cylinder and is disposed on the front side facing the first spring seat member and guides an elastic deformation of the first elastic member; and
a second elastic member which is disposed in series with the first elastic member via the second spring seat member, and elastically deformed by the pressing force due to the displacement of the simulator piston, and
wherein the second spring seat member includes a bottomed cylinder portion which is open to the side of the simulator piston, and a flow path which communicates the inside with the outside of the bottomed cylinder portion, and
wherein the cylindrical portion of the first spring seat member includes a through-hole formed for discharging brake fluid and unnecessary air which accumulates in the inside of the cylindrical portion.

2. The stroke simulator according to claim 1, wherein the flow path is formed through a side wall portion of the bottomed cylinder portion.

3. The stroke simulator according to claim 1, wherein the flow path is formed through a top wall portion of the bottomed cylinder portion formed in the second spring seat member.

* * * * *